United States Patent [19]

Hepburn

[11] 3,996,145

[45] Dec. 7, 1976

[54] FIBROUS MATERIALS

[75] Inventor: Stuart Philip Hepburn, Runcorn, England

[73] Assignee: Imperial Chemical Industries Limited, London, England

[22] Filed: Nov. 26, 1973

[21] Appl. No.: 419,014

[30] Foreign Application Priority Data

Nov. 29, 1972 United Kingdom ............. 55090/72

[52] U.S. Cl. .................................. 252/62; 106/57; 106/65; 106/69; 260/37 R; 264/176 F; 428/301; 428/379; 428/384; 428/539

[51] Int. Cl.² ................. C04B 43/02; C04B 35/48; C04B 35/10

[58] Field of Search ................. 252/62; 106/57, 65, 106/69; 260/37 SB, 37 N, 37 AL, 37 R; 264/176 F; 428/379, 384, 297–301, 539

[56] References Cited

UNITED STATES PATENTS

| | | | |
|---|---|---|---|
| 2,617,169 | 11/1952 | Bodkin | 106/57 X |
| 3,065,091 | 11/1962 | Russell et al. | 106/57 X |
| 3,077,380 | 2/1963 | Wainer et al. | 106/65 X |
| 3,094,385 | 6/1963 | Brisbin et al. | 252/62 X |
| 3,311,481 | 3/1967 | Sterry et al. | 106/65 X |
| 3,416,953 | 12/1968 | Gutzeit et al. | 106/57 X |
| 3,416,953 | 12/1968 | Gutzeit et al. | 428/539 X |
| 3,634,563 | 1/1972 | Asbury et al. | 252/62 X |
| 3,640,887 | 2/1972 | Anderson | 106/57 X |
| 3,709,706 | 1/1973 | Sowman | 106/57 |
| 3,837,891 | 12/1974 | Tietz | 428/379 X |
| 3,860,529 | 1/1975 | Hamling | 106/57 X |

*Primary Examiner*—Harold Ansher
*Attorney, Agent, or Firm*—Cushman, Darby & Cushman

[57] ABSTRACT

A fibrous structure, for example, a batt, mat, blanket, felt, cloth, paper or board, comprising staple fibers of polycrystalline alumina, alumina/silica, or zirconia having an average diameter of 0.5 to 5 microns, not greater than 20% by number of the fibers having a diameter greater than 5 microns and the shot content of the fibers being less than 5% by weight.

7 Claims, No Drawings

FIBROUS MATERIALS

This invention relates to fibrous materials and in particular to a fibrous structure comprising polycrystalline fibres of alumina or zirconia.

According to the present invention we provide a fibrous structure comprising staple fibres comprising polycrystalline alumina, alumina/silica or zirconia, said fibres having an average diameter of 0.5 to 5 microns, not greater than 20 per cent by number of the said fibres having a diameter greater than 5 microns and said fibres having a shot content of less than 5 per cent by weight.

The fibrous structure may be in any form suitable for the application to which it is put, for example a batt, mat, blanket, felt, cloth, paper or board. By shot we mean material of a non-fibrous nature.

The fibres can be loose, or consolidated by stitching or needling. Alternatively or additionally they can be made coherent as the result of bonding by means of a suitable binder, especially where structural integrity of the fibre mass has to be preserved under adverse conditions, for example vibration. Refractory materials such as refractory oxide produced from colloidal or dissolved inorganic oxy compounds such as hydrated oxide sols, for example sols of alumina, silica, titania, zirconia and mixtures of two or more of these or decomposable compounds such as alkali metal silicates, organic esters of inorganic acids such as alkyl silicates and alkyl titanates, soluble compounds of aluminium and zirconium and precursors of aluminium phosphate may be used as binders in which the structure is subjected to high temperatures. Organic resins may conveniently be used as binder for low temperature applications. The concentration of bonding agent need not be high for example up to 10% by weight. The fibres are preferably used at a packing density of 0.008 to 0.35 g/cc; for most uses, for example for the attenuation of reflected noise by absorption, a packing density of 0.008 to 0.16 g/cc is generally used. Zirconia fibres are preferably used at a packing density of 0.016 to 0.16 g/cc, more preferably 0.016 to 0.080 g/cc.

The fibre structures may be used at any desired thickness; we find that thicknesses of a few inches are generally satisfactory for most applications.

Polycrystalline alumina, alumina/silica or zirconia fibres are preferably formed by fibrising a composition having a viscosity of greater than 1 poise comprising an aqueous solution of a metal compound for example an oxychloride, basic acetate, basic formate or nitrate of aluminium and/or zirconium, and a minor proportion of a water-soluble organic polymer for example polyvinyl alcohol, polyethylene oxide or polyvinyl pyrrolidone, and, when alumina/silica fibres are required, a water soluble organic silicon compound such as a polysiloxane, drying the fibre formed and heating to decompose the metal compound to oxide and to decompose the polymer. Heating in the presence of steam is often preferred.

Fibrising is preferably carried out by a blowing process which comprises extruding the fibrising composition through one or more apertures into at least one gas stream having a component of high velocity in the direction of travel of the extruded composition. The dimensions and shape of the said aperture may vary widely. We prefer to use an aperture having at least one dimension larger than 5 microns and smaller than 500 microns. The gas stream is preferably air, more preferably air at ambient temperature. It is convenient to employ two streams of gas which converge at or near the point where the composition is extruded from the aperture; preferably the angle between the converging gas streams is from 30° to 60°. At least part of the water in the composition is removed by the gas stream, and the rate of removal may conveniently be controlled by mixing the gas with the water vapour, for example air at a relative humidity of greater than 80% may be used. The velocity of the gas stream may be varied over wide limits, but we prefer to use velocities in the region of 200 to 1500 feet per second. The pressure employed to extrude the composition through the apertures will depend on the viscosity of the composition and on the desired rate of extrusion. We find that pressures from 16 to 100 pounds per square inch absolute are convenient for compositions having viscosities up to about 100 poise.

Polycrystalline fibres are preferred to non-crystalline e.g. vitreous fibres for many applications as they can be more readily and cheaply produced at fine diameters and shot-free quality. They also have superior physical properties, especially in embodiments where the structures are subjected to high temperatures.

The fibrous structures according to the invention are useful for many technological applications, especially for acoustic and thermal insulation.

The invention is illustrated by, but not limited to, the following Examples:

EXAMPLE 1

75 ml of aluminum oxychloride solution containing 11.2% by weight of aluminium and 8.1% by weight of chloride were mixed with 45 ml of a 2.1% by weight solution of a high molecular weight polyvinyl pyrrolidone. The mixture was concentrated by evaporation under reduced pressure to a viscosity of 45 poise. The concentrated solution was introduced into fibre spinning apparatus in which two high velocity streams of air impinged from either side at an angle of 30° to a stream of the solution emerging from a 200 micron wide aperture under pressure. The air streams were at a temperature of 30° and a relative humidity of 50%.

A mat of very fine fibres having lengths up to 10 cm and diameters in the range 2–7 microns were collected on a gauze screen. The mat was heated up to 850°C over a 2 hour period to give fibres which were silky and flexible.

By this process sufficient fibre was obtained to form it into a blanket, 24 inches long, 12 inches wide, and 1 inch deep. The blanket density was measured to be 6 lb/ft$^3$; samples of fibre extracted from the blanket were tested for shot content (according to the method described in British Ceramic Research Association Technical Note 200), and a value of 0.9% by weight was found.

The diameter distribution was examined (by optical microscopy, 625 counts, according to BS 3,406 Part IV, 1963) and the results are listed below

| Diameter (micron) | % less than |
|---|---|
| 7 | 99 |
| 6 | 97 |
| 5 | 84 |
| 4 | 58 |
| 3 | 27 |
| 2 | 6 |

-continued

| Diameter (micron) | % less than |
| --- | --- |
| 1 | 0 |

EXAMPLE 2

200 ml of aluminium oxychloride solution containing 11.2% by weight of aluminium and 8.1% by weight of chloride were mixed with 120 ml of a 2% by weight solution of a polyethylene oxide (means MW about 300,000). The mixture was concentrated by evaporation under reduced pressure to a viscosity of 60 poise; the concentrate was spun into fibre by processing through a fibre blowing device in which two high velocity streams of air impinged from either side at an angle of 30° to a stream of the solution emerging from a 250 micron wide aperture under pressure. The jets of air were at a relative humidity of 55% and a temperature of 40°C.

A mat of very fine fibres having lengths up to 10 cm was collected on a guaze screen, treated with dilute ammonia gas, subjected to stream at 350° C for 15 minutes and fired at 850° C for 1 hour. They were converted to strong flexible inorganic fibres.

Sufficient fibre was made by the above process to allow formation of a paper by the following route.

10 g fibre were chopped and added to 10 l water, and dispersed using a laboratory heater for 3 minutes. To this dispersion was added 2 ml of an acrylic latex containing 50% solids. After a short period of further mixing, sufficient alum was added to bring the pH to 4.0. The stock solution was transferred to the head box of a laboratory paper former, and a sheet formed and subsequently dried at 80° C for 1 hour. The paper was 1 mm thick and had a basis weight of 200 g/m².

The fibre from which the paper was made was characterised by its fibre diameter distribution (measured according to BS 3,406 Part IV 1963) and shot content (measured according to British Ceramic Research Association Technical Note 200). Shot Content 1.1%

| Fibre Diameter (micron) | % less than |
| --- | --- |
| 7 | 98 |
| 6 | 95 |
| 5 | 78 |
| 4 | 43 |
| 3 | 19 |
| 2 | 5 |
| 1 | 0 |

Median diameter 4.2 micron

Median diameter 4.2 micron

EXAMPLE 3

A solution suitable for spinning into a high temperature resistant yttria stabilised zirconia fibre was prepared from 750 g zirconium acetate solution (22% w/w $ZrO_2$), 330 ml 1% w/w polyethylene oxide solution, 19.2 yttrium chloride hydrate and 3 ml concentrated hydrochloric acid.

The solution was concentrated by evaporation under reduced pressure to a viscosity of 15 poise at 20° C and placed in spinning apparatus with an orifice of diameter 0.004 inch.

High velocity jets of air converging at an angle of 30° from either side of this hole drew down the jet of liquid from the hole to give fibre with a mean diameter of 3.0 micron.

The fibres were fired at 850° C for one-half hour to give yttria stabilised $ZrO_2$ fibres.

250 g of these fibres were dispersed, using a Silverson mixer, for 2 minutes in 15 l water. To this dispersion was added 100 ml of a silica sol (30% solids w/v) and 50 ml of a flocculating agent (0.02% polyacrylamide), the whole then being beaten for a further 1 minute. After addition of 100 ml of saturated aluminium sulphate solution, the mixture was beaten for a further one-half minute, and then poured through a metal gauze filter. The water rapidly drained away, leaving a board 18 × 18 inches, which was dried for 10 hours at 60°–80° C. It was subsequently fired at 800° C for one-half hour, the final thickness of the board being 1/4 inch and the density being 14 lb/ft³.

The fibre which was used to make the board was characterised in terms of its fibre diameter (determined by optical microscopy according to BS 3406 part IV, 1963), and shot content (determined according to British Ceramic Research Association Technical Note 200). Shot content: 0.1% by weight

| Fibre diameter (micron) | % less than |
| --- | --- |
| 6 | 100 |
| 5 | 99 |
| 4 | 94 |
| 3 | 65 |
| 2 | 17 |
| 1 | 0 |

What we claim is:
1. A fibrous structure comprising staple fibres comprising polycrystalline alumina, alumina/silica or zirconia, said fibres having an average diameter of 0.5 to 5 microns, not greater than 20 per cent by number of the said fibres having a diameter greater than 5 microns and said fibres having a shot content of less than 5 per cent by weight.

2. A fibrous structure as claimed in claim 1 in the form of acoustic insulation.

3. A fibrous structure as claimed in claim 1 in the form of thermal insulation.

4. A fibrous structure as claimed in claim 1 wherein the fibres are at a packing density of 0.008 to 0.16 grams per cubic centimeter.

5. A fibrous structure as claimed in claim 1 in the form of a batt, mat, blanket, felt, cloth, paper or board.

6. A fibrous structure as claimed in claim 1 wherein the fibres are bound with an organic resin binder or a refractory oxide binder.

7. A fibrous structure as claimed in claim 6 wherein the refractory oxide binder is derived from a sol of alumina, silica, titania, zirconia or mixtures thereof.

* * * * *